Sept. 7, 1926. 1,598,935
C. S. ROBISON
PROCESS FOR PRODUCING CHEMICALLY PURE SODIUM CHLORIDE FROM NATURAL BRINE
Filed Jan. 29, 1925 2 Sheets-Sheet 1

INVENTOR
Clinton S. Robison
by Clarence E. Mehlhope
his ATTY.

Sept. 7, 1926.

C. S. ROBISON 1,598,935

PROCESS FOR PRODUCING CHEMICALLY PURE SODIUM CHLORIDE FROM NATURAL BRINE

Filed Jan. 29, 1925  2 Sheets-Sheet 2

INVENTOR
Clinton S. Robison
by Clarence E. Mehlhope
his ATTY.

Patented Sept. 7, 1926.

1,598,935

UNITED STATES PATENT OFFICE.

CLINTON S. ROBISON, OF CHICAGO, ILLINOIS, ASSIGNOR TO MULKEY SALT CO., OF DETROIT, MICHIGAN, A CORPORATION OF MICHIGAN.

PROCESS FOR PRODUCING CHEMICALLY PURE SODIUM CHLORIDE FROM NATURAL BRINE.

Application filed January 29, 1925. Serial No. 5,417.

This invention relates to a novel and improved process for producing chemically pure sodium chloride from natural brine adapted for use in production on a commercial scale, and consists of the matters hereinafter described and more particularly pointed out in the appended claims.

All natural brines contain a considerable percentage of foreign compounds, such as calcium sulphate, calcium bi-carbonate and others, which, when left in the brine during the process of evaporation to reduce the brine to sodium chloride, will partially precipitate and will be thrown down with the sodium chloride crystals, thereby reducing the purity of the product. In addition these impurities build up on the heat conducting surfaces of the evaporator and tend to and do retard the transference of heat, thus reducing the efficiency of the evaporator, when a vacuum evaporator is used for reducing the brine.

The object of my invention is to provide a process in and by which the foreign compounds are removed in the course of the reduction of the brine so that the sodium chloride produced will be chemically pure and free of all impurities. Another object of the invention is to apply such process in connection with the familiar continuous process or reduction of the brine by evaporation, in such manner that it will not interfere with the continuity of or interrupt the reduction process or increase the time normally required by the particular reduction process to which it is applied.

The advantages and economy of my invention will appear more clearly as I proceed with my specification.

In the process of the reduction of brine by evaporation to produce sodium chloride, as for example in a vacuum evaporator of familiar construction and operation, the said foreign compounds are continuously precipitated. Some of these compounds are precipitated by heat alone and others are caused to be precipitated by other elements purposely introduced into the brine to aid in such precipitation. These foreign precipitates at first consist of comparatively small particles, which, owing to their lightness, are not thrown down as are the heavier, larger sodium chloride crystals, but are left in suspension in the liquor. It has been found that the greater number of these particles are carried into the zone of maximum rate of circulation of the boiling liquor, wherein they are continuously suspended. Said precipitates, however, in time are accumulated in said zone and are increased in size and weight or aggregated so that a point of supersaturation of the liquor as to said impurities is ultimately reached, depending upon the rate of circulation in said zone. When such supersaturation occurs, the said impurities are thrown down with the sodium chloride, thus rendering it impure.

In carrying out my improved process in the preferred manner, I continuously remove at a predetermined rate from the zone of maximum circulation, a calculated part or proportion of the liquor containing the said impurities in suspension and subject the part of the liquor removed to filtration or other treatment for the extraction of the said impurities precipitates therefrom, after which the liquor, thus purified, is returned to the evaporator. As a result, the said foreign or impure elements are never allowed to accumulate and aggregate in the liquor in the evaporator to a sufficient extent to be thrown down with the sodium chloride crystals, so that the product is substantially free from all impurities and is chemically pure.

In addition the liquor containing the impurities is, by the preferred method, removed from the main body of liquor in the evaporator, is filtered or otherwise treated for the extraction of the said impurities, and is again returned to said main body of liquor in the evaporator, as a continuous process, and without interruption of or interference with the continuity of the reduction process.

In order to illustrate my improved process, I attach hereto drawings which illustrate an apparatus applied and connected to the familiar vacuum evaporator, by means of which the process above briefly outlined is carried out.

In the said drawings, Figure 1 is a view representing partially in elevation and partially in vertical section a single effect vacuum evaporator of the type generally used in the manufacture of sodium chloride by the vacuum evaporation process, which includes a device for carrying on my process.

Figure 1:
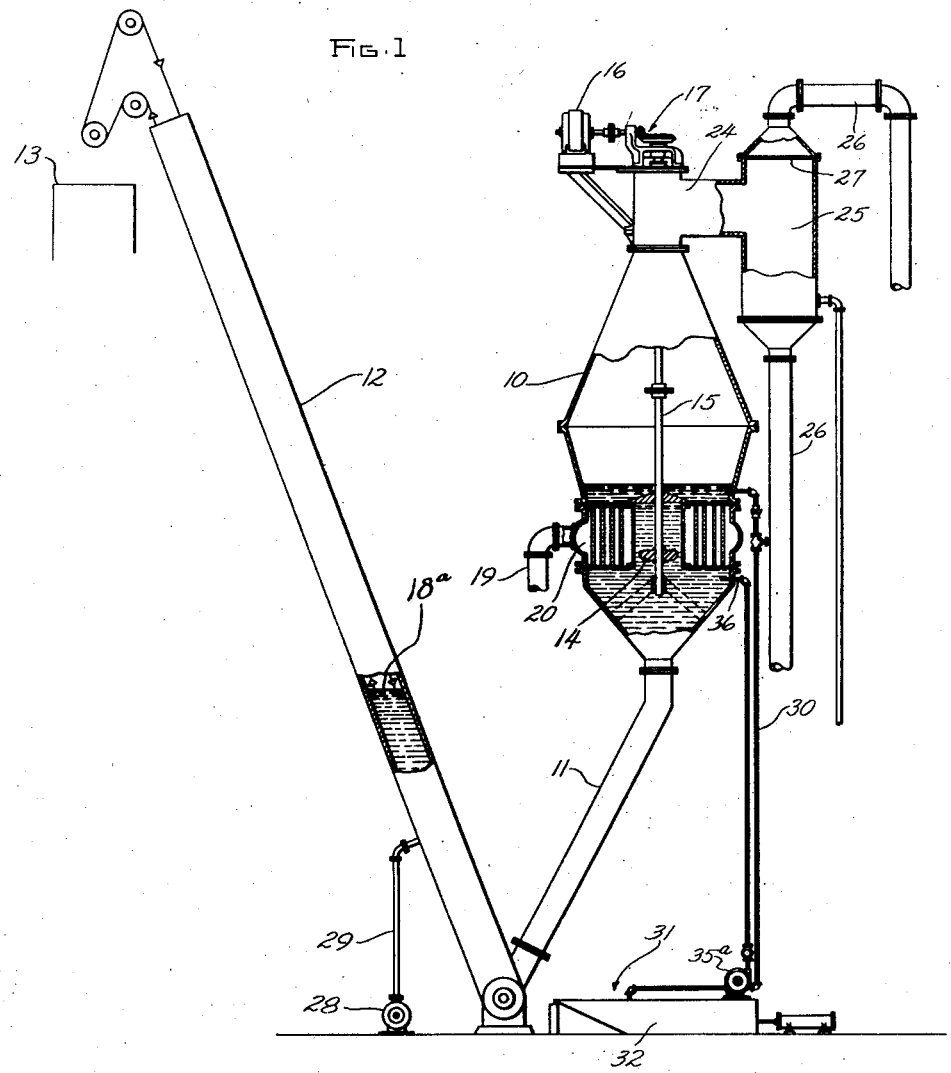
Figure 2:
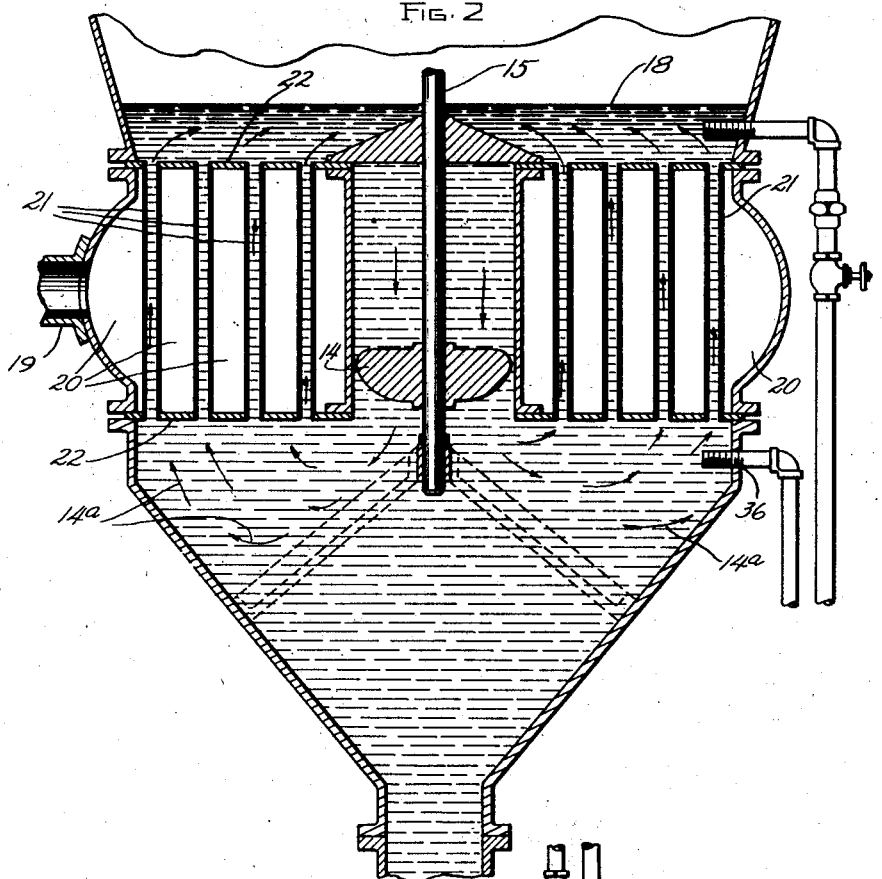
Figure 2 is a view on an enlarged scale, showing a central vertical section of the lower part of the evaporator.
Figure 3:
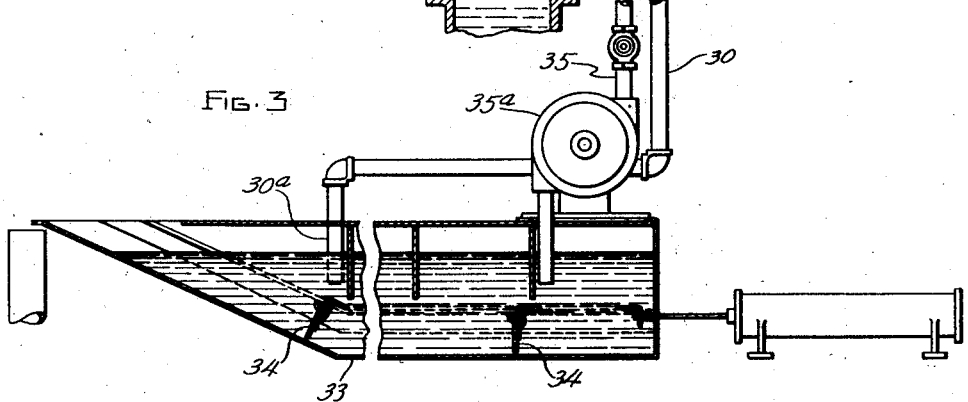
Figure 3 is a view representing a form of apparatus in section (likewise on an enlarged scale) used for extracting the precipitated impurities from the brine after the brine has been withdrawn from the evaporator and before it is returned to said evaporator.

In the drawings, 10 indicates the pan of the vacuum evaporator which contains the boiling brine; 11 indicates the discharge leg for the precipitated sodium chloride crystals; and 12 indicates a boot elevator, by means of which the sodium chloride crystals are dredged out of the liquor and discharged into bins or other handling or storage means indicated at 13. The evaporator is preferably equipped, as shown in the drawings, with an agitator or propeller 14 fixed on a vertically disposed shaft 15 and operated by a motor 16 supported at the top of the vacuum pan,—suitable gearing indicated at 17 being interposed to connect the motor to the shaft 15. The agitator or propeller 14 is located in or near the zone of greatest agitation and circulation and acts to increase the rate of circulation in the normal direction of circulation produced by the boiling of the brine, as indicated by the arrows 14$^a$.

The brine is maintained at a level in the evaporator, indicated by the line 18, and at a lower level in the boot elevator 12, indicated by the line 18$^a$,—the difference between said levels being determined by the differential of pressure between that of atmosphere and the pressure in the vacuum pan. The evaporator is heated by means of steam supplied through a pipe 19 to a chamber 20 surrounding a plurality of vertically disposed tubes 21 connecting vertically spaced headers 22, 22, which form the top and bottom walls of the steam chamber 20.

The level indicated by the line 18 is, in practice preferably, about a foot to eighteen inches above the top header 22. The vapor from the boiling brine passes up to the top of the vacuum pan and out through a laterally disposed pipe 24 into a condensor 25 through which water is discharged in the form of rain from a pipe 26 through a perforated wall 27, and the condensed vapor and cooling water is discharged from the condensor 25 through a pipe 26 to some suitable place of disposal. A pump 28 acts to continuously supply brine to the evaporator,—said pump being connected by a pipe 29 to the system at any suitable point of entry, as for example the boot elevator 12.

The apparatus thus described is a single effect vacuum evaporator of familiar construction. In the operation of said evaporator, the brine is reduced to supersaturation of the sodium chloride crystals, which are thus forced out of the solution and are thrown or settle down through the leg 11 into the boot elevator 12, by means of which they are dredged out continuously and discharged into the bins 13.

As the evaporation is continued over a long period of hours, (as has already been pointed out), there is a gradual accumulation and aggregation of precipitated impurities in the zone of maximum circulation indicated by the arrows 14$^a$. When first precipitated these impurities are held in suspension in the said circulation zone whereas only a relatively small amount of sodium chloride crystals are suspended in said zone owing to their greater mass and weight, which are sufficient to cause them to settle by gravity out of the circulation zone, whence they are discharged into the elevator boot.

The liquor in the circulation zone is thus rich in precipitates of impurities, but is comparatively free of sodium chloride precipitates. By my process, I withdraw from the said liquor in and near said zone, preferably continuously, a predetermined part, taking it from the evaporator and then treating it to extract the foreign precipitates, after which, the liquor may be again returned to the evaporator. Any convenient apparatus including a filter or other separating or extracting device may be employed for this purpose.

As shown in the drawings, a pipe 30 is connected to the evaporator, preferably at a point two inches above the top header 22. Said pipe 30 leads to a clarifying device indicated at 31, which in this instance is exemplified as a settling device of familiar construction. It consists of a flat, shallow tank 32 with the bottom wall 33 sloping upwardly at one end 33 and of a reciprocating rake 34 operated by an hydraulic motor for the removal of the precipitates from the liquor in the tank. The pipe 30 depends below the level of the liquor in the pan as indicated at 30$^a$, to provide a water seal for said pipe. After the liquor has been clarified, it is preferably returned by a pump 35$^a$, through a pipe 35 to some point in the evaporation system, which may be as shown at a point 36, below the steam jacket 20. However, as will be understood, it is immaterial at what point the brine is returned to the system.

The rate of circulation produced and the cross-section of the pipe are adjusted and calculated so that a predetermined amount of liquor is withdrawn from the circulation zone in proportion to the brine continuously supplied to the evaporator, said amount being capable of definite calculation and depending upon the percentage of impurities that are necessary to be removed.

As a specific example of the amount and rate of withdrawal of liquor from the evaporator in an apparatus utilizing approximately 5,500 gallons per hour of brine containing 5.6 grams per liter of impurities, it is necessary for best results to withdraw from the evaporator approximately 3,000 gallons per hour. In a run of 24 hours, making 300 tons of sodium chloride, I have actually produced sodium chloride which averages by test 99.6% pure, and in another case have produced sodium chloride in commercial tonnage which tested better than 99.8% pure.

As the foreign compounds are removed from the evaporator before they have time to aggregate and accumulate so as to be thrown down against the heat transferring walls of the evaporator, the application of my process in the manufacture of sodium chloride in the familiar vacuum evaporator, prevents the incrustation of the said heat transferring surfaces with the result that the evaporator process carried on to include my process operates at increased efficiency.

It is to be understood that while in describing my invention I have referred to many details of operation and in particular have described an apparatus by which my process may be carried out, the invention is in no way limited to the aforesaid details, except as may be pointed out in the appended claims, and that the apparatus described as one means of carrying out the process will be claimed in a separate application.

I claim as my invention:—

1. A process for producing chemically pure sodium chloride from saline liquor containing foreign precipitatable compounds, which consists in reducing the liquor by evaporation to precipitate the heavier sodium chloride crystals and in removing the lighter suspended foreign solids from the liquor after they have been precipitated and before they have been aggregated and accumulated to the point of supersaturation of the liquor as to said foreign solids.

2. A process for producing chemically pure sodium chloride from saline liquor containing foreign precipitatable compounds, which consists in reducing the liquor by evaporation to precipitate the heavier sodium chloride crystals, and in removing during the process of evaporation at a predetermined rate a calculated amount of the liquor in process of evaporation containing the lighter suspended foreign solids which have been precipitated but have not aggregated and accumulated to the point of supersaturation of the brine as to said foreign solids.

3. The process of producing chemically pure sodium chloride from saline liquor containing foreign precipitatable compounds, which consists in reducing the liquor by evaporation in a vacuum evaporator to precipitate the heavier sodium chloride crystals, in withdrawing from the evaporator at a predetermined rate a calculated amount of the boiling liquor containing the lighter suspended foreign solids which have been precipitated but have not yet aggregated and accumulated to the point of supersaturation of the liquor as to them, in extracting said foreign solids from the liquor thus withdrawn, and in returning the liquor thus purified to the vacuum evaporator.

4. The process of producing chemically pure sodium chloride from saline liquor containing foreign precipitatable compounds, which consists in reducing the liquor in a vacuum evaporator to precipitate the heavier sodium chloride crystals, in continuously removing from the evaporator at a predetermined rate, a calculated amount of the boiling liquor containing the lighter suspended foreign solids which have been precipitated but have not yet been aggregated and accumulated to the point of supersaturation of the liquor as to them, in treating the liquor thus removed to extract said foreign solids, and in returning the liquor thus clarified to the evaporator.

5. The process of producing chemically pure sodium chloride from saline liquor containing foreign precipitatable compounds, which consists in reducing the liquor by evaporation to precipitate the heavier sodium chloride crystals, and in removing during the process of evaporation from a point at or near the zone of greatest agitation at a predetermined rate a calculated amount of the liquor in process of evaporation.

6. The process of producing chemically pure sodium chloride from saline liquor containing foreign precipitatable compounds, which consists in reducing the liquor by evaporation to precipitate the heavier sodium chloride crystals, in removing during the process of evaporation from a point at or near the zone of greatest agitation at a predetermined rate a calculated amount of the liquor in process of evaporation, in extracting from the removed liquor the suspended foreign precipitates, and in returning the liquor thus purified for further reduction by evaporation.

7. The process of producing chemically pure sodium chloride from saline liquor containing foreign precipitatable compounds, which consists in reducing the liquor by evaporation in a vacuum evaporator to precipitate the heavier sodium chloride crystals, and in withdrawing from the evaporator from the zone of greatest agitation therein at a predetermined rate a calculated amount of boiling liquor.

8. The process of producing chemically pure sodium chloride from saline liquor containing foreign precipitatable compounds, which consists in reducing the liquor by evaporation in a vacuum evaporator to precipitate the heavier sodium chloride crystals, in withdrawing from the evaporator from the zone of greatest agitation therein at a predetermined rate a calculated amount of boiling liquor, in treating said removed liquor to extract the suspended foreign precipitates therein, and in returning the liquor thus purified to the vaccum evaporator.

9. The process of producing chemically pure sodium chloride from saline liquor containing foreign precipitatable compounds, which consists in reducing the liquor in a vacuum evaporator to precipitate the heavier sodium chloride crystals, in continuously removing from the evaporator at or near the zone of greatest agitation at a predetermined rate, a calculated amount of the boiling liquor, in treating the removed liquor to extract the suspended foreign precipitates, and in returning the liquor thus clarified to the evaporator.

10. The process of producing chemically pure sodium chloride from saline liquor containing foreign precipitatable compounds, which consists in reducing the liquor by evaporation in a vacuum evaporator to precipitate the heavier sodium chloride crystals, in accelerating in the zone of maximum agitation the rate of circulation normally produced in the evaporator, and in withdrawing from said zone of maximum evaporation at a predetermined rate, a calculated amount of the boiling liquor.

11. The process of producing chemically pure sodium chloride from saline liquor containing foreign precipitatable compounds, which consists in reducing the liquor by evaporation in a vacuum evaporator to precipitate the heavier sodium chloride crystals, in accelerating the zone of maximum agitation the rate of circulation normally produced in the evaporator, in withdrawing from said zone of maximum evaporation at a predetermined rate, a calculated amount of the boiling liquor, in treating said liquor to extract the suspended foreign precipitates therein, and in returning the liquor thus purified to the vacuum evaporator.

In testimony that I claim the foregoing as my invention, I affix my signature this 21st day of January, A. D. 1925.

CLINTON S. ROBISON.